Figure 1:
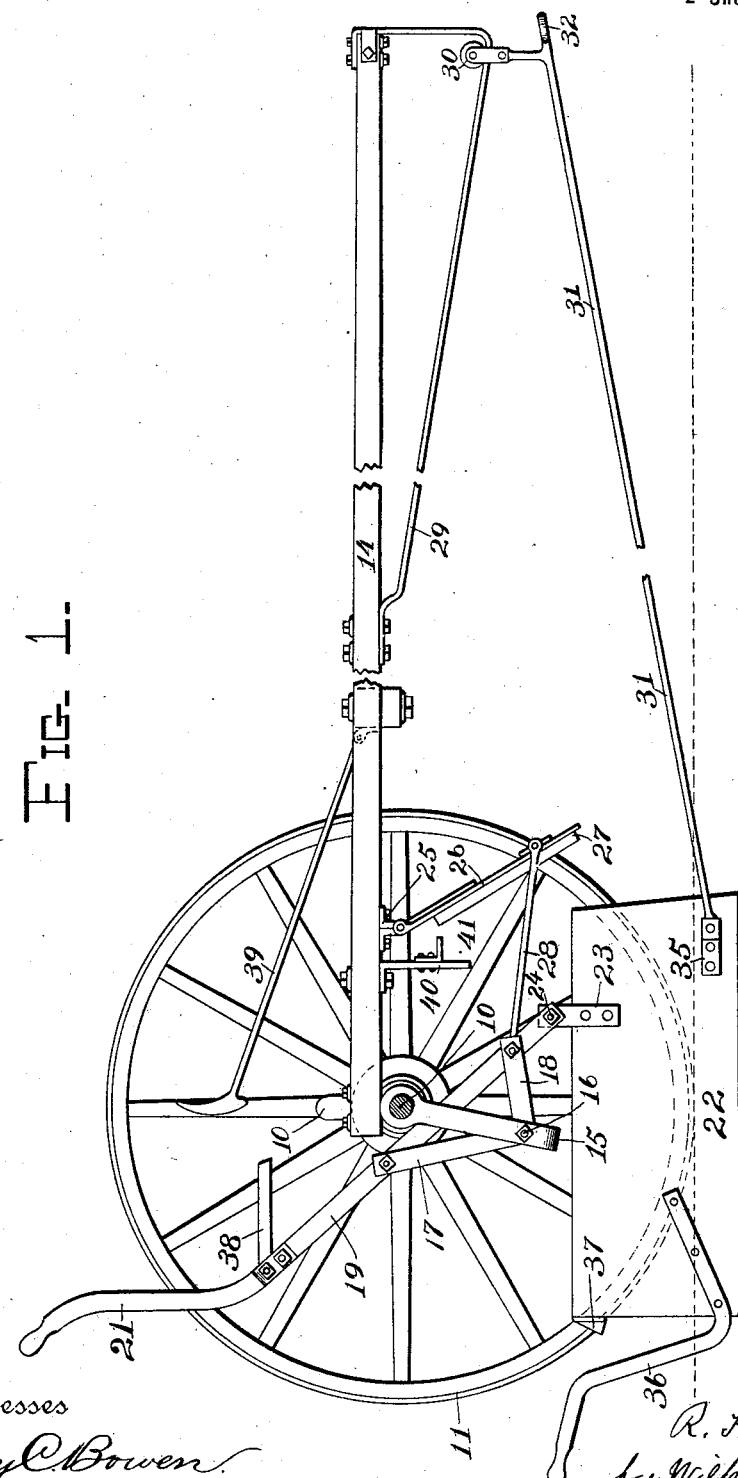

No. 608,535. Patented Aug. 2, 1898.
R. H. VILLARD.
WHEELED SCRAPER.
(Application filed June 19, 1897.)

(No Model.) 2 Sheets—Sheet 1.

Witnesses
Percy C. Bowen
John Chalmers Wilson

Inventor
R. H. Villard
by Wilkinson & Fisher
Attorneys

No. 608,535. Patented Aug. 2, 1898.
R. H. VILLARD.
WHEELED SCRAPER.
(Application filed June 19, 1897.)
(No Model.) 2 Sheets—Sheet 2.
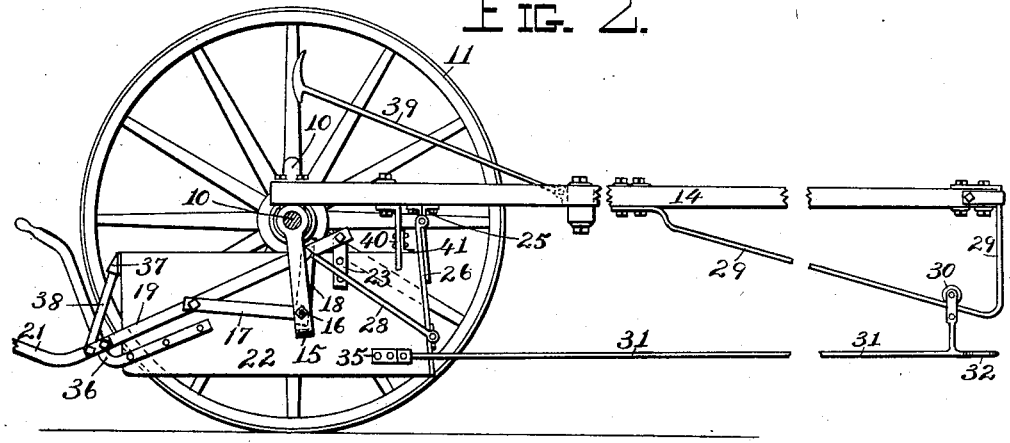
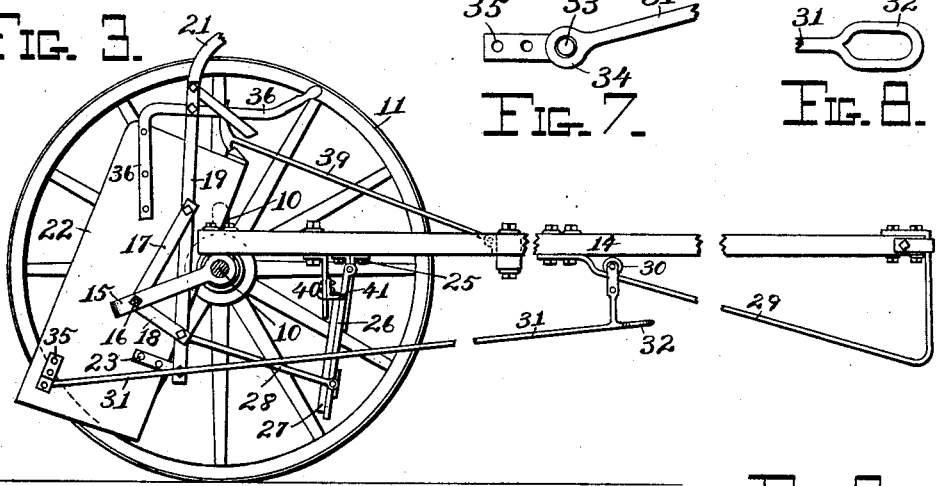
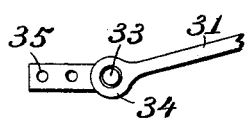
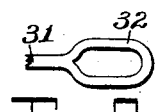
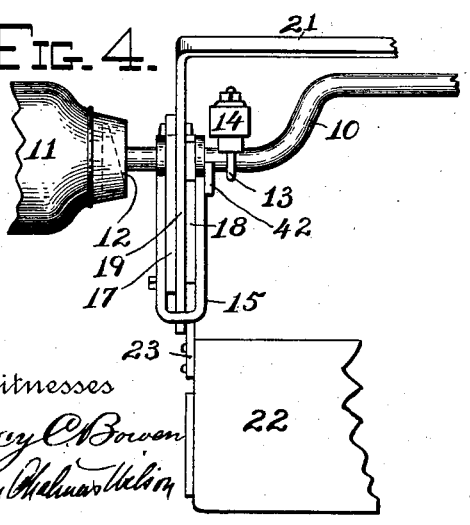
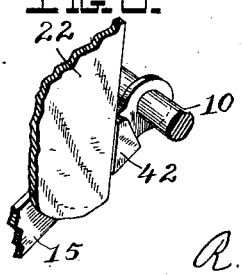
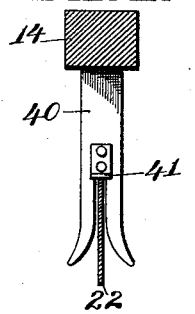
Witnesses
Percy C Bowen
John [illegible]
Inventor
R. H. Villard
by Wilkinson & Fisher,
Attorneys
THE NORRIS PETERS CO., PHOTO-LITHO., WASHINGTON, D. C.

UNITED STATES PATENT OFFICE.

RICHARD H. VILLARD, OF ATLANTA, GEORGIA.

WHEELED SCRAPER.

SPECIFICATION forming part of Letters Patent No. 608,535, dated August 2, 1898.

Application filed June 19, 1897. Serial No. 641,527. (No model.)

*To all whom it may concern:*

Be it known that I, RICHARD H. VILLARD, a citizen of the United States of America, and a resident of Atlanta, in the county of Fulton and State of Georgia, have made a certain new and useful Improvement in Wheeled Scrapers; and I hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to scrapers or shovels mounted on wheels and utilized for dredging, carrying, and dumping dirt in grading and excavation, the object of the invention being to produce a device of this class which will be thoroughly operative, cheap, and durable of construction and to produce a wheel-scraper which may be propelled by the use of a single horse by providing for the dumping in a manner which will not require the present heavy draft.

In the accompanying drawings, Figure 1 represents a side elevation of my invention with one of the wheels removed, showing the position for loading. Fig. 2 is a similar view showing the scraper in the position for carrying the load. Fig. 3 is another view similar to Figs. 1 and 2, showing the scraper in the position for dumping the load. Fig. 4 is a rear elevation of a portion of the machine, showing a part of the shovel or scraper, a part of the axle and the hub, and also the suspension-loop and levers in edge view. Fig. 5 is a detail perspective view showing a portion of one of the suspension-loops with the stop-lug for the shovel. Fig. 6 is a front elevation of one of the stop-brackets for the front end of the shovel. Fig. 7 is a detail view of one of the connections for attaching the draft-rods to the shovel, and Fig. 8 is a detail plan view of the forward end of the draft-rod.

Like reference characters are uniformly employed in the designation of corresponding elements of construction in all the views.

10 is the axle, and 11 are the wheels, which may be of any form desired; but it is preferred that the axles should be arched, as shown in Fig. 2, in order to be out of the way of the top of a pile of dirt contained in the shovel.

In order to prevent the dirt which usually falls upon the hub and axle during the operation of the device from entering the journal-bearings of the wheels, I place a wedge-shaped collar upon the axle, so as to lie just inside of the hub-band, the thinner part of said collar being at the top and the angular side being away from the hub, so that any dirt falling upon the axle and thence rebounding toward the inner side of the hub-band cannot enter the journal-bearing of the hub, but will be by the angular corner of the said collar scraped off of and guided out of the said hub-band. Secured to the axle by means of clips 13 are the thills 14, which may be of any construction desired.

Inasmuch as both sides of this machine are duplicates only one will be described.

As shown in Figs. 1 and 2, a loop 15 is suspended loosely from each end of the axle and, in the construction shown, between the thill-clip 13 and the hub of each wheel, and pivotally secured within the lower end of said loop upon a bolt 16 are two arms 17 and 18, the former of which is considerably longer than the latter, the proportions about as shown being deemed preferable, although the exact proportions are a matter of mechanical selection, so long as the arm 17 is considerably longer than the arm 18. Secured to the free ends of these arms 17 and 18 is a lever 19, the said arms being arranged substantially at a right angle to each other and the upper ends of the lever 19 being joined by a U-shaped handle-bar 21, extending from the lever 19 on one side of the machine to the same lever on the other side.

22 is the shovel, which should be of the ordinary form, consisting of a bottom and three sides, the front end being left open for the passage in of the dirt in loading and out in dumping, and to the upper edge of this shovel, on each side thereof, is connected a strap 23, which is at its upper end pivoted to the lower end of the correlative lever by a bolt 24.

Upon a bracket 25, secured to each of the thills 14, is a gate 26, which is pendent in such a position as to close the open forward end of the shovel 22 when said shovel is elevated into carrying position and being provided with a flange 27, adapted to fit within or without the end of said shovel and conceal the joint between same and the gate 26. In order to open the gate 26 upon the depression of the shovel and to close it—that is, swing it backwardly upon the elevation of the shovel into carrying position—I connect said gate 26, by means of a pitman 28, with the lever 19, making the connection of this pitman with the said lever and the said gate in such a position as will cause the gate to move a proper distance in one direction or the other upon a correlative movement of the lever 19. Upon the under side of each thill 11 is a guide-rod 29, preferably shaped and arranged as shown in Figs. 1 and 4, and on this guide-rod, by means of a friction-roller 30, if desired, runs the forward end of the draft-rod 31, which forward end is provided with a loop 32 for the attachment of a snatch-team, and said rods being pivoted by their back ends to the lower forward corner of the shovel 22. The desired manner of effecting this pivot connection is by a plate 32, bearing a pin 33, upon which is placed the loop 34 on the back end of the rod 31, and a plate 35, offset to inclose said loop, or at least to cover its outer side, being placed upon the plate 32 and receiving the outer end of the pin 33, and the two plates 32 and 35 being then securely riveted to the shovel at the point designated.

36 is a handle by means of which the shovel is manipulated manually when necessary.

37 is a lug on the back end of the shovel 22, and 38 is a pawl on the lever 19, adapted to engage the said lug 37 and prevent the upward movement of said levers or the downward movement of the back of the shovel when the same is in carrying position. This lug 37 also serves as a point of engagement for the hook-pawl 39, which is pivoted in a suitable position and engages said lug when the shovel is in dumping position.

In order to hold the forward end of the shovel 22 from being elevated and thus holding the said shovel level when in carrying position, I have secured bifurcated brackets 40 to the thills, projecting downwardly, with their bifurcations adapted to receive the upper edge of the shovel at its forward end, and in order that the said bifurcated bracket may not wear the shovel unduly I place a bracket 41 upon the side of the said bracket 40, in such a position as to be contacted with by the edge of the shovel and afford a considerable bearing-surface for same.

In Fig. 3 is shown a lug 42, of which there is one on the inner side of each of the loops 15 and into contact with which the upper edges of the shovel 22 come and limit its movement in dumping.

The operation of this device is as follows: As shown in Fig. 1, the parts are in the position of loading—that is, scraping—the earth up into the shovel 22, the said shovel 22 being depressed and the gate 26 being swung forwardly and the levers 19 being elevated. At this time a snatch-team consisting of one or two horses, according to the condition of the ground, is hitched to the forward ends of the rods 31 by means of the loops 32. This is continued until the shovel is full, when the levers 19 are depressed until the shovel 22 is raised into its horizontal elevated position, which closes the gate 26 against the open end of said shovel by the double action of the levers 19 and pitmen 28. As soon as the levers 19 are depressed to their limit the pawl 38 engages with the lug 37 and holds them depressed, which will obviously hold the shovel suspended and in carrying position. As the shovel is elevated the short arm of the levers 19 gradually become shorter, so that the strain on the working parts is reduced to a minimum. When it is desired to dump the load, the levers 19 are turned into vertical position, tilting the forward end of the shovel downwardly into contact with the ground, whereupon the horse will assist in the dumping until the shovel is raised into such a position that the hook-pawl 39 engages the lug 37, when the dumping will be complete and the shovel will be raised above and out of danger of contact with the dirt which was dumped therefrom.

Having thus described my invention, what I claim as new, and desire to secure by Letters Patent of the United States, is—

1. In a wheeled scraper, a truck, levers fulcrumed on pendent bars, near each end of the axle thereof, a shovel pivotally secured to the forward end of said levers, and adapted to be raised and lowered thereby, a gate pendent from the thills in a position opposite said shovel when elevated, and means for swinging said gate forward on the depression of the shovel and backwardly into contact with the open end thereof when elevated.

2. In a wheeled scraper, a truck, levers fulcrumed on pendent bars near each end of the axle thereof, a shovel pivotally secured to the forward ends of said levers and adapted to be raised and lowered thereby, a gate pendent from the thills in a position opposite the mouth of the said shovel when elevated and means for swinging said gate forward on the depression of the shovel and backwardly in contact with the open end thereof when elevated, consisting of two pitmen connecting said gate to said lever.

3. In a wheeled scraper, a truck, with a shovel movably suspended under said truck and on pendent bars near each end of the axle thereof; thills attached to the axle; guide-rods suspended at one end from the forward ends of said thills, and inclined upwardly toward the rear thereof and secured thereto; and draft-rods connected to the front end of said shovel and suspended from said inclined guide-rods, substantially as described.

4. In a wheeled scraper, a truck, a shovel suspended beneath said truck; means for raising and lowering said shovel; thills attached to the axle of said truck; guide-rods suspended from the forward ends of said thills, and inclined upwardly toward the rear thereof and secured thereto; draft-rods connected to the front end of the said shovel; and links attached to said draft-rods and inclosing said guide-rods and movable longitudinally thereon, substantially as described.

5. In a wheel-scraper, a truck, a shovel suspended thereunder and means for elevating and depressing same, and a bifurcated bracket adapted to straddle and position the upper edge of said shovel, for the purpose specified.

6. In a wheel-scraper, a truck, pendent bars near each end of the axle thereof, a lever fulcrumed on each of said bars upon a downwardly-projected fulcrumed portion, and a shovel suspended from the ends of said levers, substantially as and for the purpose specified.

7. In a wheel-scraper, a truck, bars pendent from the axle thereof, two divergent bars pivotally secured to the lower end of each of said pendent arms and a lever secured to the upper ends of each pair of said divergent bars, and a shovel suspended pivotally from the forward ends of said levers substantially as specified.

8. In a wheel-scraper, a truck, bars pendent from the axle thereof, two divergent bars pivotally secured to the lower end of each of said pendent arms and a lever secured to the upper ends of each pair of said divergent bars, a shovel suspended pivotally from the forward ends of said levers, and a lug on the inner side of each of said pendent arms forming a motion-limiting stop for said shovel, substantially as specified.

9. In a wheeled scraper a truck consisting of wheels and axle, scraper elements suspended on pendent bars near each end of the axle and an axle-collar secured to each end of said axle in a position for the abutment of the inner end of the hub and within the hub-band or counterbore, each having its side opposite each hub beveled thinner at the top with its face at the thicker portion projecting out of said hub-band.

In testimony whereof I hereunto affix my signature in presence of two witnesses.

RICHARD H. VILLARD.

Witnesses:
ALBERT P. WOOD,
S. M. WOOD.